United States Patent
Doumani et al.

(10) Patent No.: US 6,167,626 B1
(45) Date of Patent: Jan. 2, 2001

(54) DUST COLLECTION PORT FOR USE WITH A SAW

(75) Inventors: Robert Doumani, Hoffman Estates; Dennis Powell, Elk Grove Village, both of IL (US)

(73) Assignee: S-B Power Tool Company, Broadview, IL (US)

(*) Notice: Under 35 U.S.C. 154(b), the term of this patent shall be extended for 0 days.

(21) Appl. No.: 09/365,124

(22) Filed: Jul. 30, 1999

(51) Int. Cl.$^7$ ........................................................ B27B 9/00
(52) U.S. Cl. .................................................. 30/124; 30/390
(58) Field of Search ........................... 30/124, 390, 391; 144/252.1; 451/451, 453, 456

(56) References Cited

U.S. PATENT DOCUMENTS

| | | | |
|---|---|---|---|
| 2,989,995 | * 6/1961 | Happe | 30/391 |
| 3,882,598 | * 5/1975 | Earle et al. | 30/390 |
| 4,022,182 | * 5/1977 | Lenkevich | 30/390 |
| 4,281,457 | * 8/1981 | Walton, II | 30/124 |
| 4,466,187 | 8/1984 | Morimoto | 30/124 |
| 4,675,999 | 6/1987 | Ito et al. | 30/124 |
| 4,856,394 | 8/1989 | Clowers | 83/56 |
| 5,033,192 | * 7/1991 | Franz et al. | 30/124 |
| 5,074,044 | * 12/1991 | Duncan et al. | 30/124 |
| 5,084,972 | 2/1992 | Waugh | 30/124 |
| 5,121,543 | * 6/1992 | Onose et al. | 30/124 |
| 5,146,682 | 9/1992 | Blochle et al. | 30/124 |
| 5,235,753 | * 8/1993 | Stumpf | 30/390 |
| 5,287,780 | 2/1994 | Metzger, Jr. et al. | 83/102.1 |
| 5,327,649 | 7/1994 | Skinner | 30/124 |
| 5,440,809 | 8/1995 | Padilla | 30/124 |
| 5,445,056 | 8/1995 | Folci | 83/100 |
| 5,634,274 | * 6/1997 | Ohkouchi et al. | 30/124 |
| 5,675,895 | 10/1997 | Mori et al. | 30/124 |
| 5,774,992 | 7/1998 | Lindenmuth | 30/124 |
| 5,822,864 | * 10/1998 | Campbell et al. | 30/390 |
| 5,832,614 | 11/1998 | Gallagher et al. | 30/391 |

* cited by examiner

Primary Examiner—Hwel-Slu Payer
(74) Attorney, Agent, or Firm—Gardner, Carton & Douglas

(57) ABSTRACT

A dust collection port for a circular saw is formed on the upper rear end of a blade guard. A spring biased door pivotally moved between a closed position and an open position is provided over the port. The guard includes exit ribs and return ribs in the region of the port where the ribs direct the flow of the dust formed by the saw blade. The door includes ribs on the underside surface to secure a hose in the port when the door is in the open position. When the door is in the open position, dust flows through cavity formed by the guard into the exit ribs and into a hose inserted into the port. In the closed position, the dust flows through the exit ribs and into the return ribs to exit through the open lower end of the guard.

26 Claims, 5 Drawing Sheets

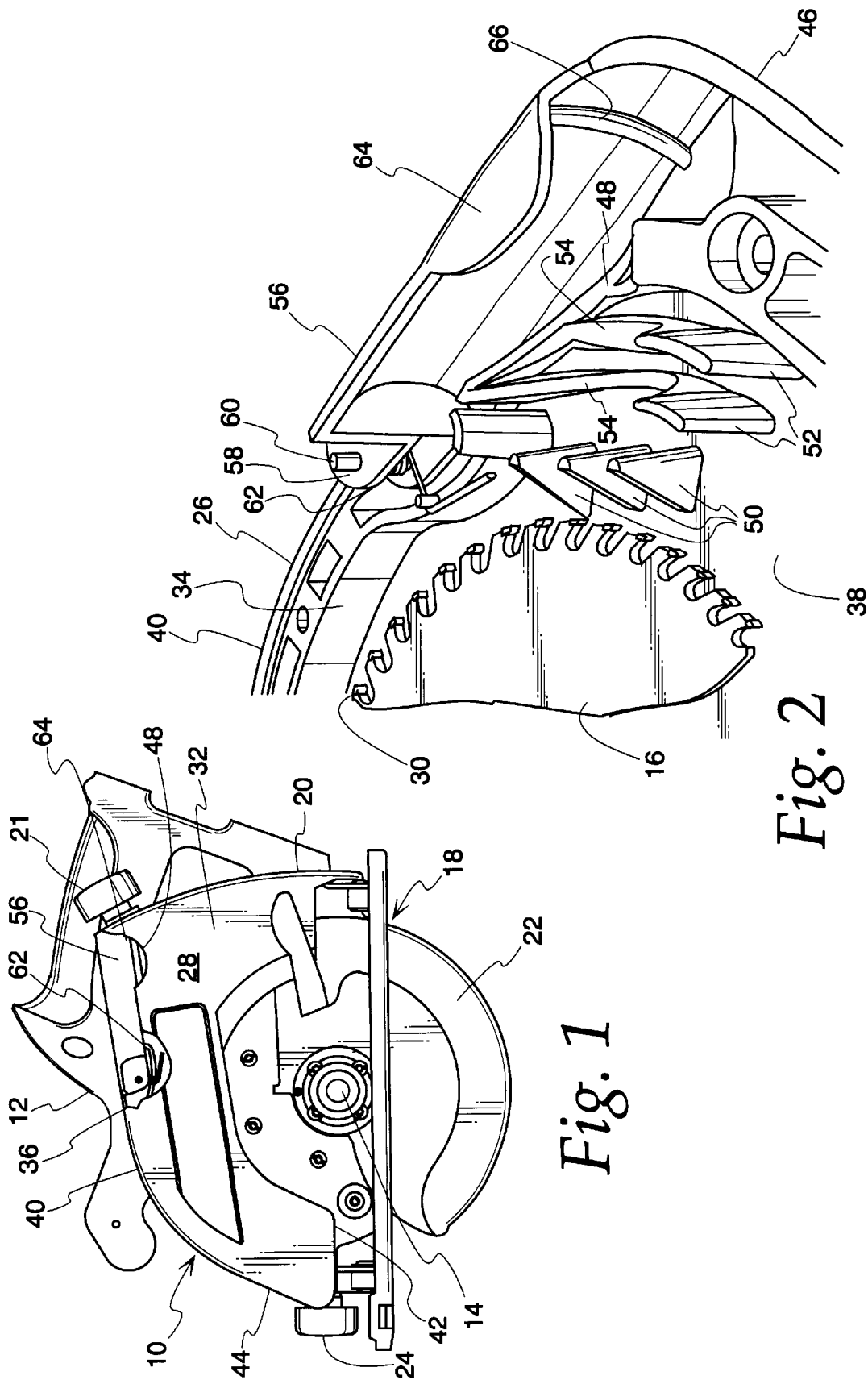

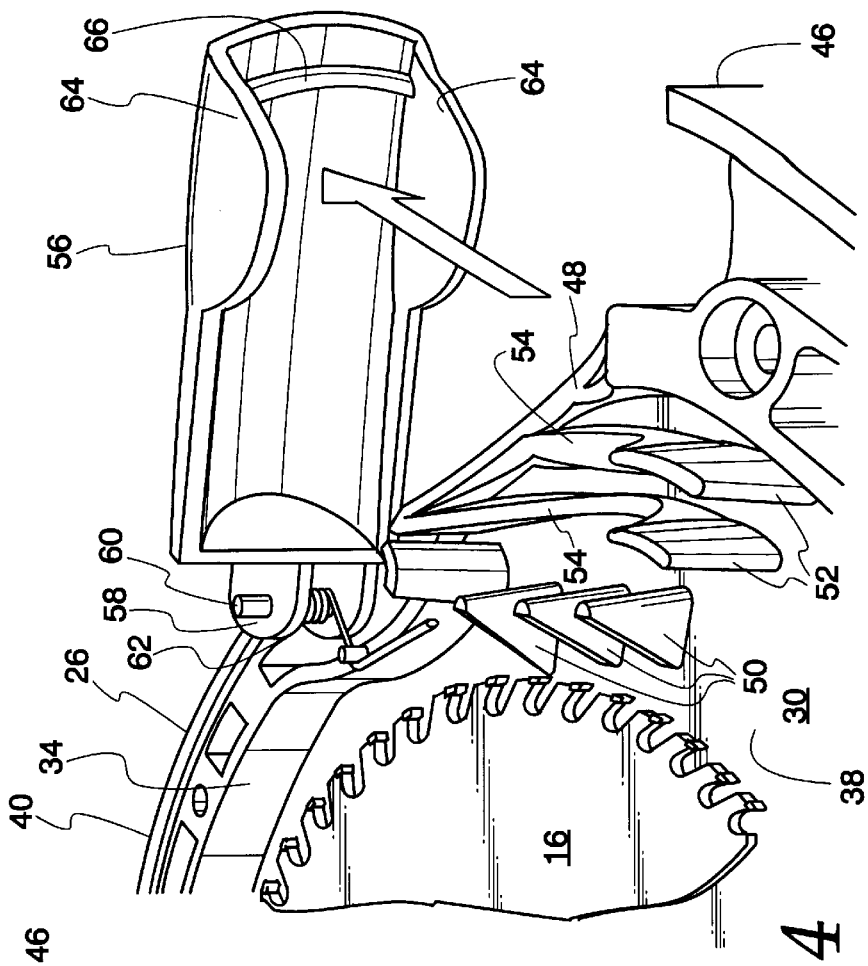
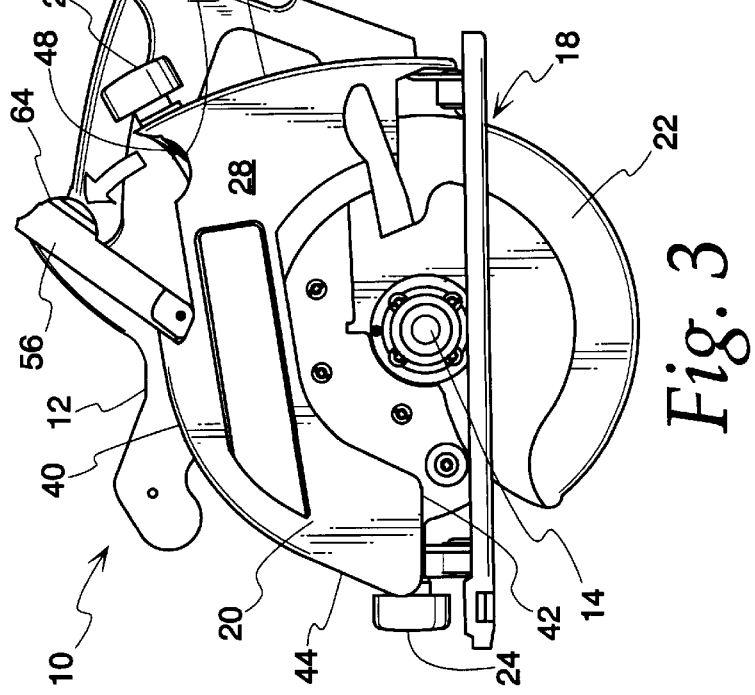
Fig. 3
Fig. 4

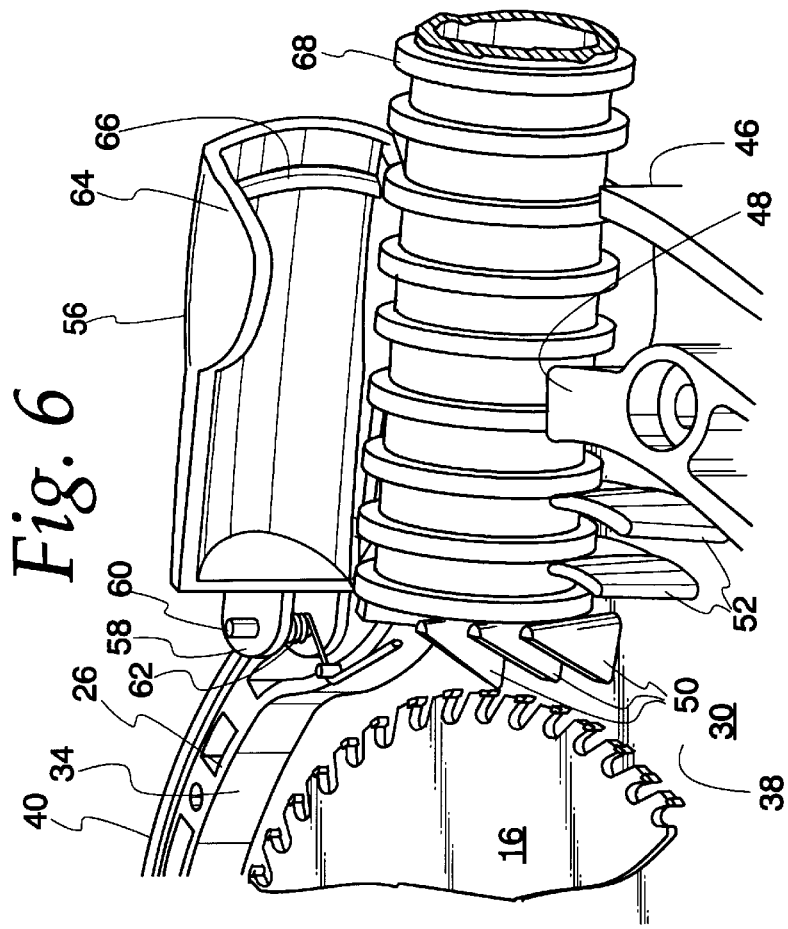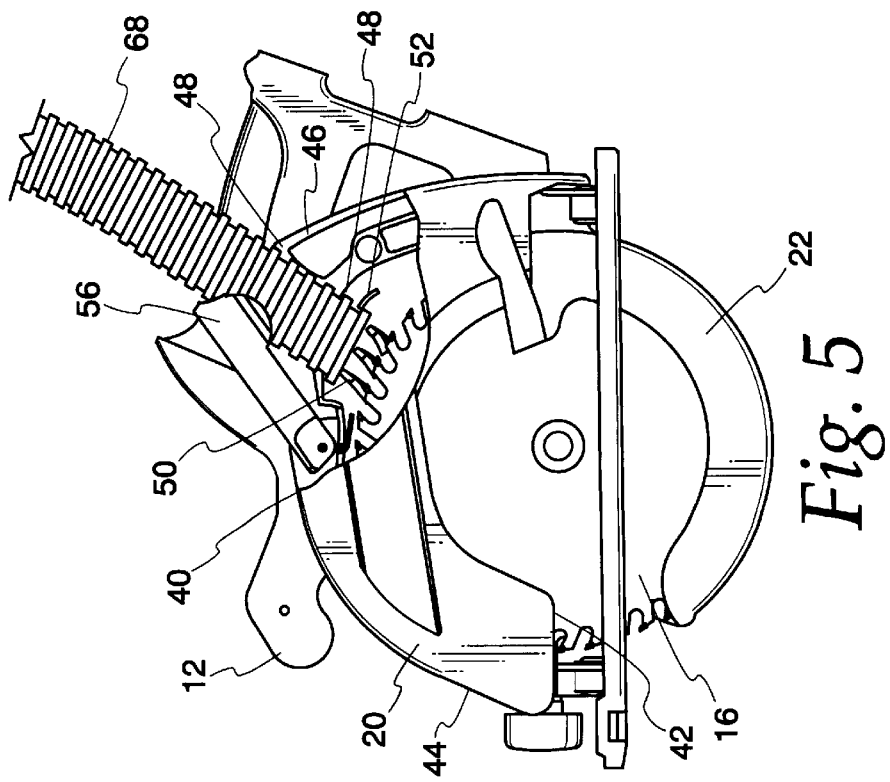

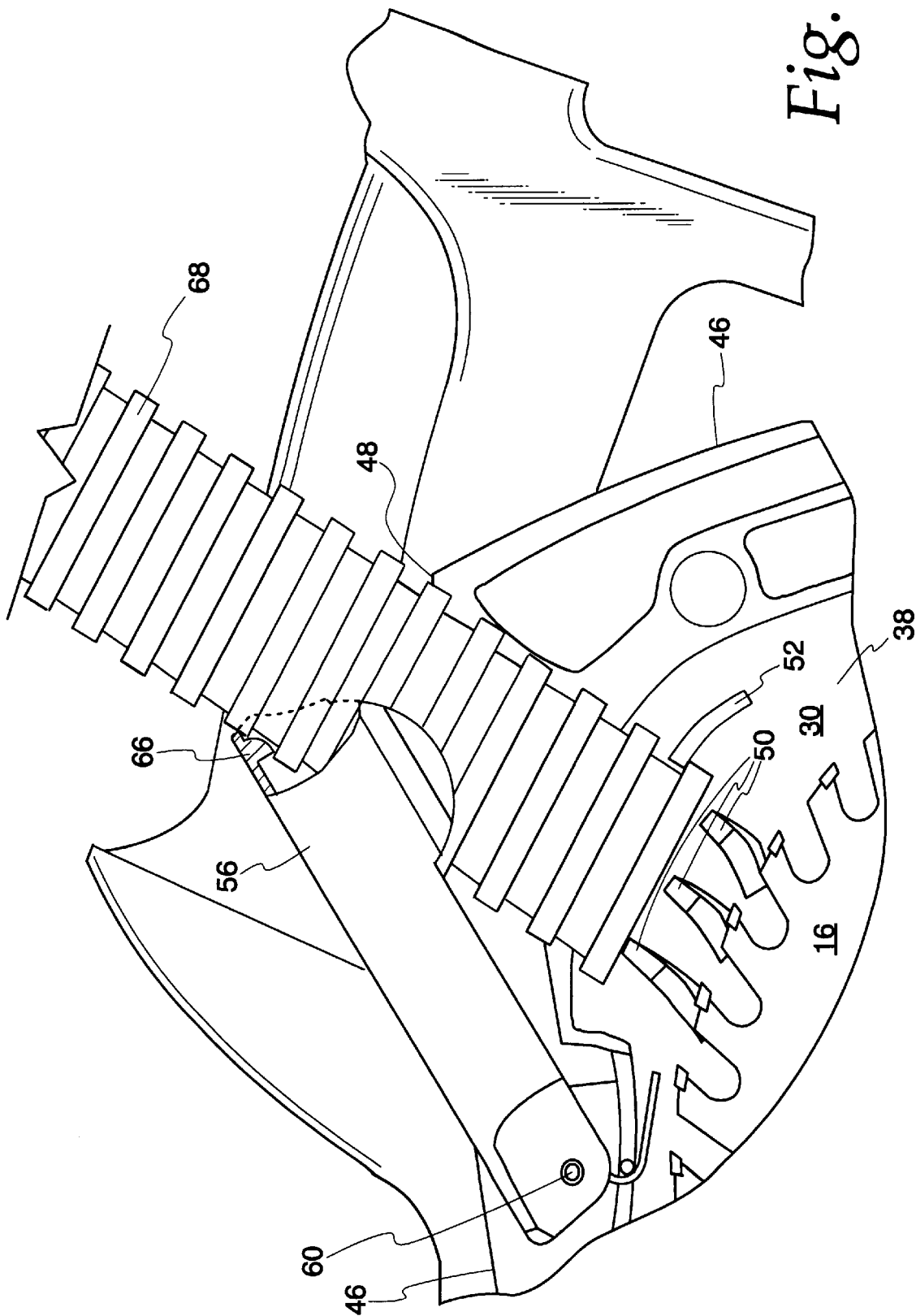

DUST COLLECTION PORT FOR USE WITH A SAW

BACKGROUND OF THE INVENTION

1. Field of the Invention

The present invention relates to saws and, in particular, to a dust collection port configured on the blade guard of a circular saw.

2. Scope of the Prior Art

Blade guards have long been used with circular, table, radial arm, and other types of saws that have rotating blades. As the blade rotates and cuts a material, like wood, dust is produced which is channeled through the guard. Typically, the dust exits an open lower end of the guard. The heavier saw dust will quickly settle to the floor, but the lighter dust remains suspended in the air for a period of time.

Different mechanisms have been used to confine the dust produced by the blade. The most common means provides a port, or opening, on the guard. A hose is then connected to the port so that the dust can be deposited in a drum or other container. The air currents through the guard can divert dust through the port into the hose. In addition, vacuums, such as shop-type vacuums, can also be used to pull dust through the port. Alternatively, containers that hold the dust are connected directly to the saw.

Many circular saws have the saw blade on the right side of the power tool. On saws of this style, ports are often positioned on the outer side of the guard. Because of the right side configuration of the saw, the hose does not interfere with the use of the saw. Recently, circular saws have been made that position the blade on the tool's left side. A dust collection port positioned on the outer left side of the guard, however, directs the hose towards the user thereby making it difficult to operate the saw. The hose also obstructs the view of the blade during cutting. Alternatively, other saws have the dust collection port positioned towards the front end of the guard. These ports can direct dust upwards or in front of the saw. In addition, it is known to position the port on the rear end of the guard. U.S. Pat. No. 5,327,649 to Skinner discloses a port on the rear end of the guard towards the upper end. The port is at the end of a tube that extends from the guard. U.S. Pat. No. 5,084,972 to Waugh also discloses a port on the rear end of the guard but towards the lower end. The prior art does not disclose a port on the upper end of the guard towards on the rear of the saw. Nor does it disclose a port in that position so that the hose is directed in a convenient direction when connected to a right-sided saw.

Typically, the dust collection port of the prior art remains open at all times. When the saw is operating the dust will go through the port. If a hose is not connected to the port, then the dust will be projected out of the port directly into the surrounding environment. It has been known to use a spring-loaded door to close the port so that a hose is not required. The doors known in the prior art only close the port and do not have any other function.

Hoses are connected to the port in a variety of ways. The port can be threaded so that a threaded hose can be secured in the port. The port and hose can also be configured with other known attachment mechanisms to ensure that the hose does not come detached during operation of the saw. Some of these mechanisms are cumbersome to use. For example, U.S. Pat. No. 4,856,394 to Clawers discloses a dust collection port positioned on the front end of the guard. The port has spring-loaded door to close the port. In order to connect the hose to the port and ensure that the hose does not interfere with the operation of the saw, a shoulder tube is inserted into the port. The tube is directed in the desired direction and the hose is connected to the tube. The prior art, however, does not disclose the use of a port door to secure the hose in place during operation of saw.

Prior art dust collection systems typically provide only an opening for the dust to exit the guard. Due to the shape of the guards, it is common for dust to collect in pockets formed around the port. The collection of dust can make it difficult for dust to escape through the port. Skinner and Waugh do disclose a channel that extends from the front lower end of the guard through to the port at the rear end of the guard. The saws that include those channels only capture a portion of the dust and only that dust that enters the channel. The prior art does not disclose the use of guides or other methods to direct the dust in the channel in the vicinity of the port.

SUMMARY OF THE INVENTION

The present invention discloses a saw having a dust collection port on the blade guard that overcomes the deficiencies of the prior art. The dust collection port is positioned on the upper end of the guard towards the rear end and is angled within the guard so that when a hose is connected to the port it is directed away from the saw. In addition, the port is provided with a spring-loaded port door that is biased into the closed position to secure the hose within the port when the door is in the open position. The door is provided with a rib on its underside so that the rib will engage with the hose that is inserted in the port. The rib, and therefore the door, assists in holding the hose within the port. The guard also includes two sets of ribs within the vicinity of the port to direct the dust into the port and to prevent clogs from forming within the guard. The ribs also prevent objects from entering the guard through the port that can damage the blade during operation of the saw.

The saw of the present invention includes a main casing that houses a motor. The motor rotates a shaft to which a blade is removably connected. As is known, the blade has a plurality of teeth on its outer circumference that are used to cut a material such as wood. The saw also includes a guard that surrounds the upper portion of the blade. The guard has an upper end, a lower end, a front end and a rear end. The guard is made with a main portion that is adjacent to the main casing and a cover portion that connects to the main portion. The main and cover portions form a cavity within the guard.

The present invention provides a dust collection port on the guard. The opening or port is provided on the upper end of the guard towards and proximate the rear end. The port extends from that location on the outer surface of the guard through to the cavity within the guard. During operation of the saw, saw dust will pass through the guard and exit through the port. The port is designed to hold a hose. In the preferred embodiment the port is angled from the guard's upper rear end to the shaft so that dust will exit the guard efficiently.

A door is pivotally connected to the guard in the region of the dust collection port. The door is movable between a closed position, where it covers the port, and an open position, to provide access to the inner cavity. When the door is closed during operation of the saw, the dust exits the guard through the open lower end. When the door is open during operation of the saw, at least a portion of the dust exits the guard through the port. A torsion spring can be positioned between the door and the guard to bias the door into the closed position thereby preventing the door from inadvertently opening during operation of the saw.

The spring-biased door will also push against the hose when it is inserted into the port when the door is in the open position thereby holding the hose. On the underside of the door, at least one rib can be formed to also assist in holding the hose within the port. The rib extends laterally on the door and engages with the accordion, or ribbed, outer surface of the hose. The door can also have side flanges for pulling on the door to move it from the closed position to the open position.

As mentioned, the dust formed by the blade during operation of the saw moves through the guard to exit through the port. In order to direct the dust from the cavity to the port, the present invention provides a first set of ribs, or exit ribs, proximate the port and the outer edge of the guard. The direction of these ribs follows the angle as the port. The angle of the port and the exit ribs are designed so that the optimum amount of dust will exit the guard through the port.

The present invention includes a second set of ribs also in the vicinity of the port for when the door is closed. The second set of ribs, or return ribs, are configured generally perpendicular to the exit ribs. The return ribs extend within the cavity from a point proximate the exit ribs towards the lower end of the guard. When the door is closed, the dust that is forced through the exit ribs will come into contact with the door. Instead of become clogged, the dust falls through the return ribs and exit the guard through the lower end like in a conventional circular saw. The air currents that force the dust through the exit ribs will also extend through the cavity to force the dust into the return ribs to re-enter the stream of dust through the guard and out the lower end. It will be appreciated that the number and exact configuration of exit and return ribs can be modified.

These and numerous other features and advantages of the present invention will become readily apparent from the following description, the accompanying drawings and the appended claims.

BRIEF DESCRIPTION OF THE DRAWINGS

FIG. 1 illustrates a circular saw made in accordance with the principles of the present invention and having a dust collection port where the port door is in the closed position;

FIG. 2 illustrates a main portion of the guard having the port opening and exit and return ribs, with the port door in the closed position;

FIG. 3 illustrates the circular saw of the present invention with the port door in the open position;

FIG. 4 illustrates the main portion of the guard having the port and exit and return ribs with the port door in the open position;

FIG. 5 illustrates the dust collection port with the port door in the open position and a vacuum hose inserted into the port;

FIG. 6 illustrates the main portion of the guard having the vacuum hose inserted into the port;

FIG. 7 is a further illustration of the view shown in FIG. 6, and

DETAIL DESCRIPTION OF THE PREFERRED EMBODIMENT

Figure 8:
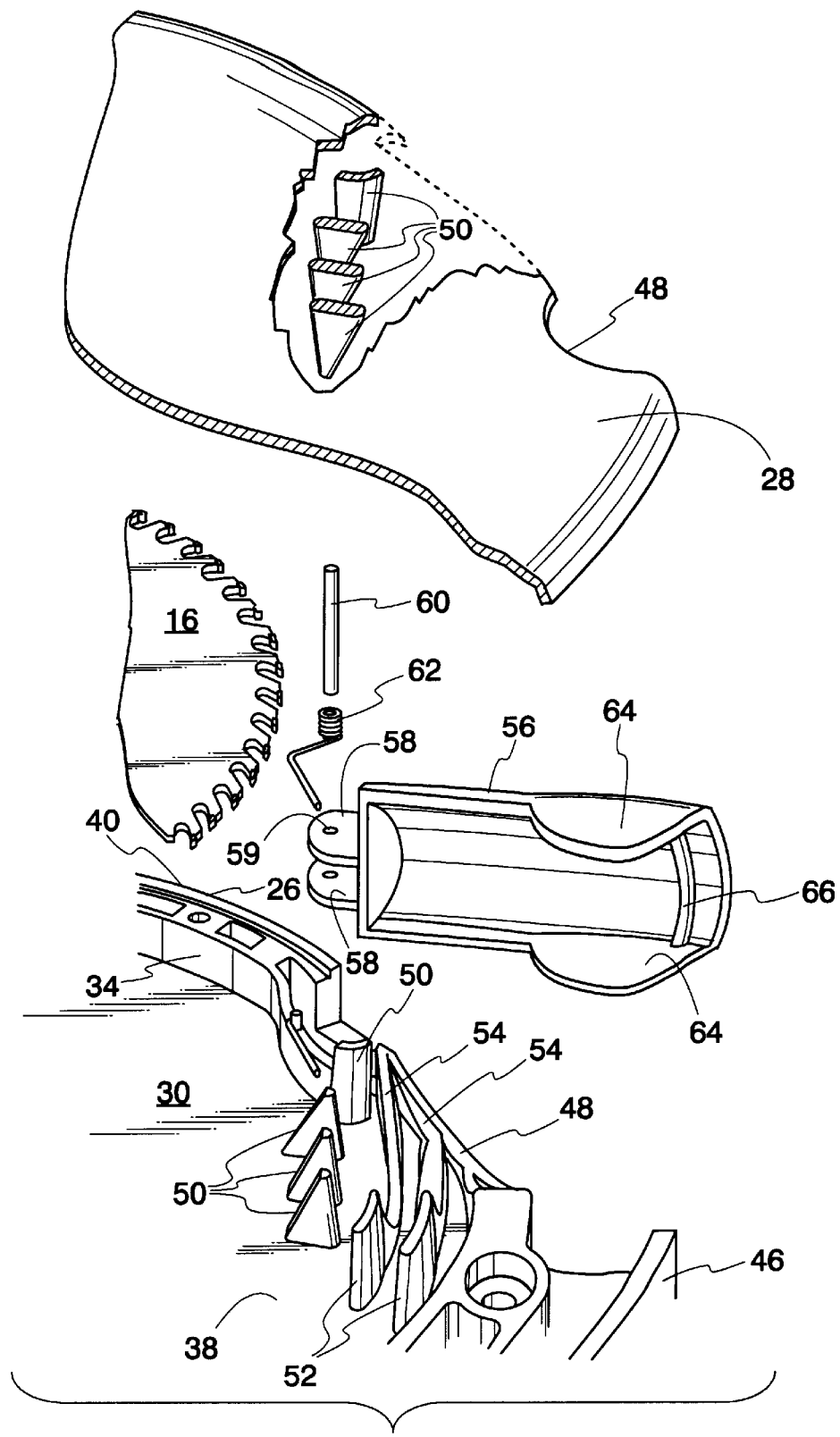
FIG. 8 shows an exploded view of the elements of the present invention.

FIG. 1 illustrates a circular saw 10 that incorporates the dust collection port of the present invention. Although the present invention will be discussed in the context of a circular saw, it will be understood that its principles can be used with table, radial arm and other types of saws that include blade guards. The circular saw includes a main casing 12 that houses a motor (not shown.) The power for the motor can be provided by a battery (not shown) or any other known power source. As is well known in the art, the motor rotates a shaft 14 and the saw blade 16 that is attached to the shaft's end. The saw 10 also includes a guard assembly 18 that encases the blade 16. The guard assembly 18 includes an upper guard portion 20 and a lower guard portion 22. The upper guard 20 covers approximately the upper half of the blade 16 and is attached to the main casing 12 to secure the guard assembly 18 in position. The lower guard portion 22 covers the lower region of the blade 16 and moves into the upper guard portion 20 as the blade 16 cuts a material, such as wood. The guard assembly 18 can be adjusted by knobs 24 as is known in the art.

Referring to FIGS. 1–4, the upper guard 20 includes a main portion 26 that connects in a known manner to the main casing 12 and a cover portion 28 that is attached to the main portion 26. The upper guard 20 has an upper end 40, lower end 42, front end 44, and rear end 46. As shown, the main and cover portions 26, 28 have a side 30, 32, respectively, and a rim 34, 36, respectively, formed along the sides' front, upper and rear edge. The main and cover portions 26, 28 are connected in any known manner such that the sides 30, 32 and rim 34, 36 create an inner cavity 38 for the upper guard 20. The guard's rear end 46 is open to the cavity 38 so that the blade 16 rotates within the cavity 38.

In FIGS. 1–4, the saw 10 is illustrated with a dust collection port 48 formed in the guard 20. The port 48 made in accordance with the principles of the present invention can be placed at any location on the guard 20. In the preferred embodiment, the port 48 is positioned on the upper end 40 proximate, or towards, the rear end 46. The port 48 can be round and, in the preferred embodiment, is an elongated oval shape. The port 48 provides a passage between the outer surface of the upper guard 20 and the cavity 38. In the preferred embodiment, the orientation of the passage is angled from the upper rear end of the guard towards the shaft. That orientation and the location of the port 48 position a hose towards the rear of the saw so that the hose does not interfere with the saw's use. When the port is open, as seen in FIGS. 3 and 4, dust created by the blade 16 during operation of the saw can pass through the port 48. Any dust that does not pass through the port 48, or when the door is closed as seen in FIGS. 1 and 2, exits through the open lower end 42 of the guard 20.

Referring to FIGS. 2 and 4, the upper guard 20 is provided with a first set of ribs, or exit ribs, 50. The exit ribs 50 are positioned between the blade 16 and the port 48. In the preferred embodiment, there are three exit ribs 50 although any number can be provided. The ribs 50 are separated by a sufficient distance so that dust produced by the blade 16 will easily pass through them. The distance between the ribs 50 also prevents larger objects from entering the cavity 38 from the port 48. The optimum angle of the ribs 50 within the cavity follows the path of the dust as it passes through the cavity 38 from the front end 44 of the upper guard 20. To prevent unnecessary obstructions within the cavity 38 and around the port 48, the ribs 50 are configured of triangular-like tabs that are formed on the inner walls of sides 30, 32. A gap can be provided between the ends of both the tabs.

As seen in FIGS. 2 and 4, the present invention also includes a second set of ribs, or return ribs, 52. Return ribs 52 are also proximate the port 48, but are positioned in the cavity 38 generally perpendicularly to the exit ribs 50. As seen, the return ribs do not obstruct the path between the exit ribs 50 and the port 48. Smaller return rib extensions 54 can be provided between the return ribs 52 to the port 48. In the preferred embodiment, there are two return ribs 52 although any number can be provided. The return ribs 52 are separated by a sufficient distance so that dust produced by the blade will pass from the exit ribs 50 through the return ribs 52 when the port 48 is closed. The return ribs 52 will also prevent larger objects from entering the cavity when the port 48 is open. The orientation of the return ribs 52 within the cavity 38 follows the path of dust through the cavity from the exit ribs towards the lower end 42 of the upper guard 20. Similar to the exit ribs 50, the return ribs can be configured as tabs that are formed on the inner walls of the sides 30, 32. A gap can be provided between both ends of the tabs. In the preferred embodiment, the return ribs 52 are curved thereby directing the dust in the appropriate path through the cavity 38.

As seen in the Figures, the present invention includes a port door 56 that is pivotally movable between a closed position and an open position. The door 56 is shaped to completely cover the port when it is in the closed position and so that dust will not escape through the port 48. Thus, the saw 10 will operate as a standard saw without a dust collection system. In the open position, the door 56 exposes the port 48 so that an opening is provided in the guard 20.

Referring to FIG. 8, the door is an elongated element that has tabs 58 extending from one end. The tabs 58 include holes 59 through which an axle 60 is held. The axle 60 is held in position by the upper guard 20. The door 56 pivots about the axle 60 between the open and closed position. Other means of pivotally connecting the door to the guard can be used. A torsion spring 62 can also be positioned between the door 56 and the guard 20 to bias the door 56 into the closed position. Because of the spring, the saw can be used in an inverted position without the door inadvertently opening. As will be described in more detail below, the spring-biased door 56 will engage with a hose inserted into the port 48 and will ensure that the door 56 will not open when the saw is inverted or at other times. The door 56 is also provided with side flanges 64 that extend form door's elongated edges. A user grips flanges 64 to grip to open the door 56. On the underside of the door 56, at least one holding rib 66 extends laterally between the flanges 64. The holding ribs extend from the underside of the door 56 to fit within the recesses of an accordion hose 68 that is inserted into the port 48. When multiple ribs are provided, they are spaced apart a sufficient distance to fit between different recesses in the hose 68.

As seen in FIGS. 5–7, a hose 68 can be inserted into the port 48. It is preferable to use an accordion-type hose, but the principles of the present invention can accept any style hose. To insert the hose 68, the door 56 is pulled into the open position, and the hose 68 is inserted into the port 48 so that the hose's end is within the cavity 38. Preferably, the diameter of the hose 68 corresponds to the shape of the port 48 so that dust will not escape through gaps provided between the hose 68 and the guard 20. When the hose 68 is inserted, the end can engage with at least one return rib 52 to secure the hose in the port 48. Once the hose 68 is properly inserted, the door 56 can be released so that it is biased against the hose 68 with the door's holding ribs 66 engaged against the hose 68. When an accordion hose is used, the door ribs 66 fit within the recess of the hose to secure it in the port 48. Due to the angle of the port 48, the hose is directed towards the rear of the saw 10. Preferably, the hose 68 will follow under the arm of the user so that it will not hinder the use of the tool.

In operation, the dust collection port 48 is used to direct dust formed by the blade 16 away from the blade and the working surface on the wood. The hose 68 is therefore inserted into the port 48 when the door 56 is in the open position and held in place by the holding ribs 66. When the blade 16 cuts the wood, dust is directed into the guard 20 at the front end 44. The rotation of the blade 16 creates currents through the guard 20 and the dust travels through the cavity 38. When the dust reaches the upper rear end of the cavity, the dust is channeled through the exit ribs 50 and into the hose 68 through the port 48. A vacuum (not shown), such as a shop-type vacuum, can be used to pull dust through the exit ribs 50 and into the hose 68. Dust that does not enter the hose 56 will continue through the cavity 38 and exit through the open lower end 42. That dust may pass through the return ribs 52. When a hose is not used, the door is biased by the torsion spring 52 into the closed position. Dust formed at the front end 44 of the guard passes through the cavity 38 to exit from the lower end. In the vicinity of the port 48, dust enters and exits the exit ribs 50 and then passes through the return ribs 52. Dust therefore does not get clogged in the region around the port.

Although the present invention has been described in considerable detail with reference to certain preferred versions, other versions are possible. Therefore, the spirit and scope of the appended claims should not be limited to the description of the preferred embodiment described.

What is claimed:

1. A saw comprising:
   a casing;
   a motor having a rotatable shaft wherein the motor is supported in the casing;
   a blade removably connected to the shaft;
   a guard surrounding an upper portion of the blade, the guard being connected to the casing and having an upper end, a lower end, a front end and a rear end;
   a port positioned on the upper end of the guard towards the rear end;
   a first set of ribs formed within the guard proximate the port;
   a second set of ribs formed within the guard proximate the port; and
   a door movably connected to the guard to provide a closure to the port, the door including a rib on an underside of the door to engage with a hose inserted into the port;
   wherein dust generated by the blade during operation of the saw exits through the first set of ribs and through the port where the door is in an open position and moves through the first set of ribs and second set of ribs and exits through the lower end of the guard when the door is in a closed position.

2. The saw according to claim 1 wherein the first set of ribs is generally perpendicular to the second set of ribs.

3. The saw according to claim 1 further comprising a spring positioned between the guard and the door to bias the door in the closed position.

4. A circular saw comprising:
   a guard encasing a portion of a blade wherein the guard forms a cavity in which the blade rotates, the guard having an upper end, a lower end, a front end and a rear end,
   a covering means connected to the guard, the covering means being adapted to move between an open position and a closed position, a dust collection port positioned on the upper end of the guard proximate the covering means, and wherein dust from cutting is directed substantially through the dust collection port only when the covering means is in the open position.

5. The circular saw according to claim 4 further comprising exit ribs formed within the cavity, the exit ribs being positioned proximate the dust collection port wherein dust formed by the blade exits the guard through the exit ribs and the dust collection port.

6. The circular saw according to claim 4 further comprising return ribs formed on the guard within the cavity, the return ribs positioned proximate the dust collection port wherein dust formed by the blade passes through the return ribs and exits the lower end of the guard.

7. The circular saw according to claim 4, wherein said covering means is in the form of a door, and the door is movable between an open position so that dust formed by the blade exits through the dust collection port and a closed position so that dust formed by the blade exits through the lower end of the guard.

8. The circular saw according to claim 7 further comprising a spring positioned between the guard and the door to bias the door into the closed position.

9. The circular saw according to claim 7 wherein the door comprises a rib on the underside surface thereof to retain a hose inserted in the port when the door is in the open position.

10. The circular saw according to claim 4 wherein the guard comprises exit ribs and return ribs within the cavity and wherein the exit ribs are generally perpendicular to the return ribs and proximate the port.

11. A saw comprising
 a guard wherein the guard forms a cavity;
 a rotatable blade partially contained within the cavity;
 a port formed in the guard providing access to the cavity;
 ribs formed within the cavity and proximate the port wherein the dust produced by the blade passes through the ribs to the port.

12. The saw according to claim 11 wherein the ribs include at least one exit rib diverting dust from the cavity to the port.

13. The saw according to claim 11 wherein the ribs include at least one return rib diverting dust from an area proximate the port through the cavity.

14. The saw according to claim 11 wherein the ribs comprise a first set of exit ribs and a second set of return ribs such that the dust produced by the blade passes through the exit ribs and exits through the port when the port is open, and passes through the exit ribs and the return ribs when the port is closed.

15. The saw according to claim 11 wherein the guard comprises a main section and a cover section and the ribs are formed on an inner surface of the main section and the cover section.

16. The saw according to claim 11 further comprising a door movably connected to the guard to cover the port, wherein the door moves between an open position and a closed position.

17. The saw according to claim 16 further comprising a spring positioned between the door and the guard to bias the door in the closed position.

18. The saw according to claim 16 wherein the door having a rib formed on an under surface exposed to the cavity, and the rib engaging with a vacuum tube inserted into the port when the door is in the open position.

19. The saw according to claim 11 wherein the guard has an upper end, a lower end, a front end and a rear end, and wherein the port being positioned on the upper end towards the rear end.

20. A saw comprising:
 a guard wherein the guard forms a cavity;
 a rotatable blade at least partially contained with the guard;
 a port formed in the guard providing access to the cavity; and
 a door movably connected to the guard between a closed position closing the port and an open exposing the cavity, wherein the door having a rib formed on an underside thereof to engage with a vacuum tube inserted into the port.

21. The saw according to claim 20 further comprising a spring connected between the guard and the door wherein the spring biases the door in the closed position.

22. The saw according to claim 20 further comprising a set of exit ribs within the cavity and proximate the port wherein the dust produced by the blade passes through the exit ribs and the port when the door is in the open position.

23. The saw according to claim 22 further comprising a set of return ribs within the cavity and proximate the exit ribs wherein the dust passes through the exit ribs and returns to the cavity through the return ribs when the door is in the closed position.

24. The saw according to claim 23 wherein the exit ribs are generally perpendicular to the return ribs.

25. The saw according to claim 20 wherein the guard has an upper end, a lower end, a front end and a rear end and the port being formed in the upper end toward the rear end.

26. The saw according to claim 20 wherein the door having flanges extending from a side edge thereof for holding the door to move it into the open position.

* * * * *